United States Patent
Florencio et al.

(10) Patent No.: US 12,037,538 B2
(45) Date of Patent: Jul. 16, 2024

(54) SYNERGISTIC BLENDS OF FLUORO-INORGANICS AND INORGANIC ACIDS FOR REMOVING DEPOSITS AND STIMULATING GEOTHERMAL WELLS

(71) Applicant: ECOLAB USA Inc., St. Paul, MN (US)

(72) Inventors: Javier Florencio, Reus (ES); Jean-Michel Maquinghen, Amsterdam (NL); Jasbir S. Gill, Naperville, IL (US)

(73) Assignee: ECOLAB USA INC., St. Paul, MN (US)

( * ) Notice: Subject to any disclaimer, the term of this patent is extended or adjusted under 35 U.S.C. 154(b) by 0 days.

(21) Appl. No.: 17/438,785

(22) PCT Filed: Mar. 28, 2019

(86) PCT No.: PCT/US2019/024558
§ 371 (c)(1),
(2) Date: Sep. 13, 2021

(87) PCT Pub. No.: WO2020/197559
PCT Pub. Date: Oct. 1, 2020

(65) Prior Publication Data
US 2022/0145160 A1    May 12, 2022

(51) Int. Cl.
*C09K 8/52*    (2006.01)
*C09K 8/84*    (2006.01)

(52) U.S. Cl.
CPC ............ *C09K 8/52* (2013.01); *C09K 8/845* (2013.01)

(58) Field of Classification Search
CPC .. C09K 8/52; C09K 8/60; C09K 8/845; E21B 43/25; Y02E 10/10
See application file for complete search history.

(56) References Cited

U.S. PATENT DOCUMENTS

| 2,078,981 A | 5/1937 | Stacey |
| 3,589,859 A | 6/1971 | Foroulis |
| 3,994,817 A | 11/1976 | Quintana |
| 5,000,916 A | 3/1991 | Vukasovich et al. |

(Continued)

FOREIGN PATENT DOCUMENTS

| CN | 101553508 A | 10/2009 |
| CN | 103987746 A | 8/2014 |

(Continued)

OTHER PUBLICATIONS

The International Search Report and The Written Opinion of the International Searching Authority, mailed Sep. 9, 2021, for PCT/CN2020/132621, 11 pages.

(Continued)

*Primary Examiner* — Alicia Bland
(74) *Attorney, Agent, or Firm* — Eric D. Babych; Barnes & Thornburg LLP

(57) ABSTRACT

The present disclosure relates to the treatment of formation rock or scale. The rock or scale may be located in a geothermal well. The rock or scale may be treated with a stimulation fluid. The stimulation fluid includes a salt of a nitrogen base having a fluoro inorganic anion and an acid component. The rock may include quartz. The acid component may include hydrochloric acid.

15 Claims, 3 Drawing Sheets

(56) References Cited

U.S. PATENT DOCUMENTS

| | | | |
|---|---|---|---|
| 5,665,242 A | 9/1997 | Gallup | |
| 5,858,245 A | 1/1999 | Gallup | |
| 6,478,033 B1 | 11/2002 | Foster | |
| 6,491,048 B1 | 12/2002 | Foster | |
| 6,503,334 B2 | 1/2003 | Ruiz et al. | |
| 8,389,453 B2 | 3/2013 | Thomson | |
| 8,450,257 B2 | 5/2013 | Thomson | |
| 8,796,195 B2 | 8/2014 | Thomson | |
| 8,859,476 B2 | 10/2014 | Thomson | |
| 9,404,067 B2 | 8/2016 | Batton et al. | |
| 9,932,255 B2 | 4/2018 | Hoots et al. | |
| 10,005,950 B2 | 6/2018 | Smith et al. | |
| 10,035,949 B2 | 7/2018 | Gill et al. | |
| 2002/0129837 A1 | 9/2002 | Ruiz et al. | |
| 2004/0192046 A1 | 9/2004 | McFarland et al. | |
| 2005/0016731 A1* | 1/2005 | Rae | C09K 8/72 507/260 |
| 2009/0042748 A1* | 2/2009 | Fuller | C09K 8/78 507/260 |
| 2009/0176689 A1 | 7/2009 | Thomson | |
| 2009/0233819 A1 | 9/2009 | Fuller et al. | |
| 2011/0079392 A1 | 4/2011 | Reyes | |
| 2012/0260938 A1 | 10/2012 | Zack et al. | |
| 2013/0137622 A1 | 5/2013 | Borst et al. | |
| 2013/0178405 A1* | 7/2013 | Thomson | C11D 7/08 564/8 |
| 2014/0054233 A1 | 2/2014 | Harrison | |
| 2014/0128294 A1 | 5/2014 | Gatlin et al. | |
| 2014/0296113 A1 | 10/2014 | Reyes et al. | |
| 2015/0080282 A1 | 3/2015 | Krishna et al. | |
| 2015/0197712 A1 | 7/2015 | Ekanayake et al. | |
| 2016/0060576 A1 | 3/2016 | Batton et al. | |
| 2016/0076456 A1 | 3/2016 | Ekanayake et al. | |
| 2016/0160111 A1 | 6/2016 | Smith et al. | |
| 2016/0272879 A1 | 9/2016 | Reddy et al. | |
| 2017/0051194 A1 | 2/2017 | Sommese et al. | |
| 2017/0051198 A1* | 2/2017 | Gill | C09K 8/528 |
| 2017/0218261 A1* | 8/2017 | Nguyen | E21B 43/25 |
| 2017/0335174 A1* | 11/2017 | Blattel | E21B 43/25 |
| 2018/0094538 A1 | 4/2018 | Tibbetts et al. | |
| 2018/0155841 A1 | 6/2018 | Thomson | |
| 2018/0355492 A1 | 12/2018 | Brooks et al. | |

FOREIGN PATENT DOCUMENTS

| | | |
|---|---|---|
| CN | 104962266 A | 10/2015 |
| CN | 106609133 A | 5/2017 |
| CN | 107912045 A | 4/2018 |
| CN | 111936535 A | 11/2020 |
| JP | H09206733 A | 8/1997 |
| JP | H1068723 A | 3/1998 |
| JP | 2004217779 A | 8/2004 |
| JP | 2007002014 A | 1/2007 |
| JP | 2007154668 A | 6/2007 |
| JP | 1971(S46)-018201 B1 | 1/2011 |
| JP | 2011021543 A | 2/2011 |
| JP | 2017535408 A | 11/2017 |
| RU | 2013123142 A | 11/2014 |
| WO | 200011046 | 3/2000 |
| WO | 2009061487 A1 | 5/2009 |
| WO | 2015077737 A1 | 5/2015 |
| WO | 2016033259 A1 | 3/2016 |
| WO | 2017004177 A1 | 1/2017 |
| WO | 2017031103 A1 | 2/2017 |
| WO | 2017031282 A1 | 2/2017 |

OTHER PUBLICATIONS

The International Search Report and The Written Opinion of the International Searching Authority, mailed Nov. 27, 2019, for PCT/US2019/024558, 14 pages.

Invitation to Pay Additional Fees and Communication Relating to the Results of the Partial International Search, mailed Jul. 24, 2019, for PCT/US2019/027838, 11 pages.

Harrar, J.E., et al., "On-Line Tests of Organic Additives for the Inhibition of the Precipitation of Silica from Hypersaline Geothermal Brine," Apr. 3, 1979, Lawrence Livermore Laboratory, USA, 30 pages.

IUPAC—trace element T06421 (Year: 2014).

* cited by examiner

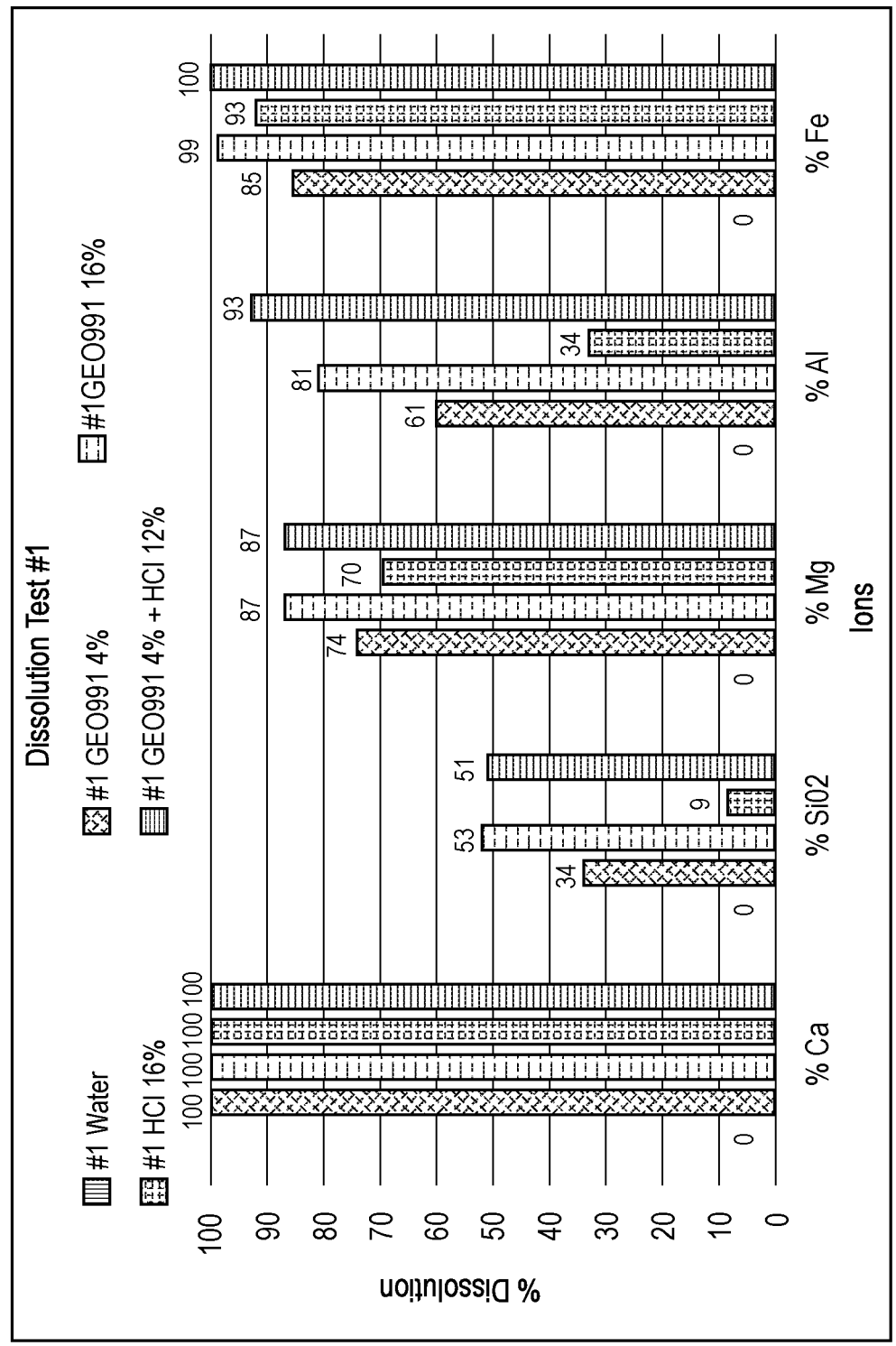

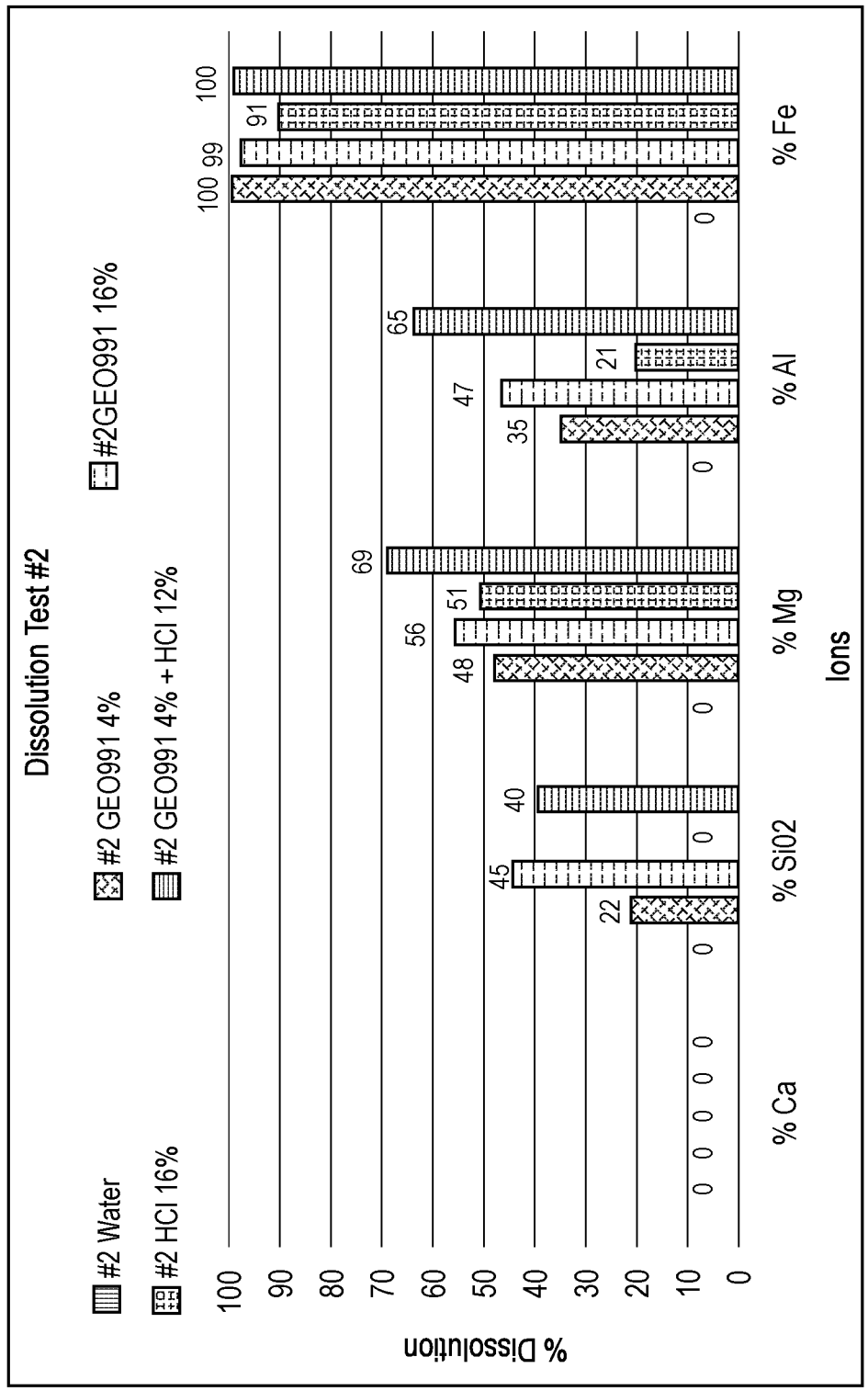

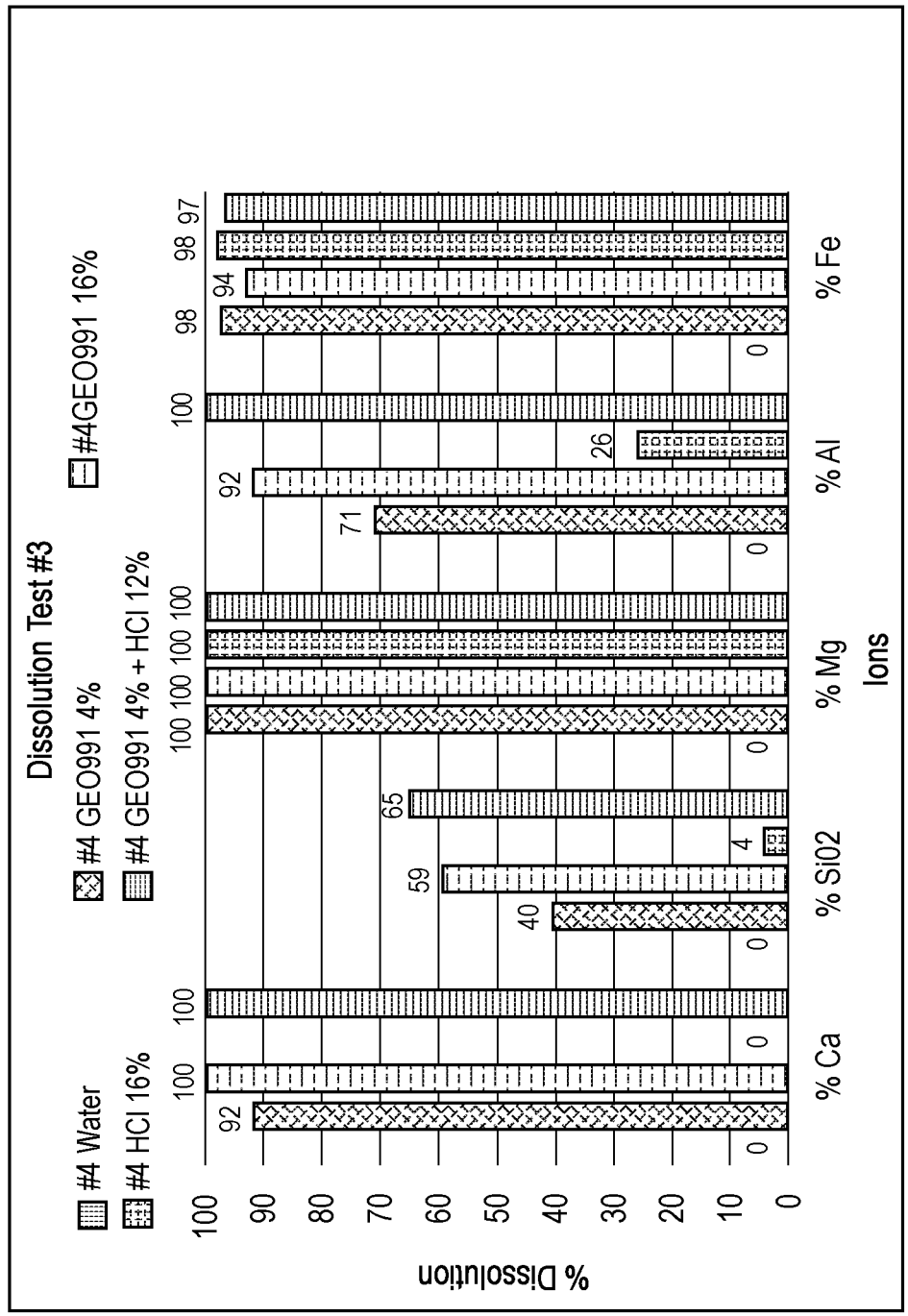

SYNERGISTIC BLENDS OF FLUORO-INORGANICS AND INORGANIC ACIDS FOR REMOVING DEPOSITS AND STIMULATING GEOTHERMAL WELLS

CROSS-REFERENCE TO RELATED APPLICATION

This application is a U.S. national counterpart application of international application serial No. PCT/US2019/024558 filed Mar. 28, 2019, the disclosure of which is hereby expressly incorporated by reference in its entirety.

BACKGROUND

1. Field of the Invention

The present disclosure generally relates to methods and fluids for treating formation rock and/or scale associated with geothermal systems.

2. Description of the Related Art

Geothermal energy is energy in the form of heat within the interior of the earth, which is tapped by geothermal wells. Since the earth's interior is extremely hot, it contains an enormous potential energy supply. However, there are many technical and economic challenges in optimizing the tapping of this energy source. The use of geothermal energy as a renewable energy source, nonetheless, has gained in importance as other energy sources become less abundant and more expensive.

Geothermal energy moves towards the earth's surface by thermal conduction through solid rock. Thermal energy can also be transmitted towards the earth's surface by movement of molten rock or by circulation of fluid ($H_2O$ as steam or water) through interconnected fractures and pores, which may provide heat reservoirs closer to the surface, and thus a site more accessible to drilling for wells to tap geothermal energy.

Natural geothermal reservoirs, on which many commercial geothermal wells are located, comprise volumes of rock at high temperatures (up to about 350° C. or higher depending upon the depth of the well and geographical location of the resource) with high porosity and high permeability to fluids. Wells are drilled into such reservoirs and the thermal energy in the rock is transferred by conduction to a fluid ($H_2O$ as water or steam), which subsequently flows to the well and then up to the earth's surface.

While geothermal power plants remain attractive from an environmental perspective, scale control in geothermal wells, and equipment associated with geothermal wells, remains an issue that must be addressed. In addition to power generation form these resources, the resources may also be used for process and district heating. Further, geothermal wells may need to be stimulated to improve the porosity of the formation and increase productivity of the resource.

BRIEF SUMMARY

The present disclosure provides methods and fluids for treating formation rock and/or scale associated with geothermal systems. In some embodiments, a method of treating formation rock comprises introducing a stimulation fluid into a wellbore of a well, wherein the well comprises the formation rock; and contacting the formation rock with the stimulation fluid, wherein the stimulation fluid comprises a salt of a nitrogen base having a fluoro inorganic anion and an acid component.

The well may be a geothermal well and the fluoro inorganic anion may be selected from the group consisting of tetrafluoroborate, hexafluorophosphate, and any combination thereof.

The nitrogen base may be selected from the group consisting of urea, biuret, an alkyl urea, an alkanolamine, an alkylamine, a dialkylamine, a trialkylamine, an alkyldiamine, an alkyltriamine, an alkyltetramine, a polyamine, an acrylamide, a polyacrylamide, a vinyl pyrollidone, a polyvinyl pyrollidone, and any combination thereof. In some embodiments, the nitrogen base comprises urea. In some embodiments, the salt of the nitrogen base having the fluoro inorganic anion is urea tetrafluoroborate.

In some embodiments, the acid component is selected from the group consisting of hydrochloric acid, hydrobromic acid, hydrofluoric acid, formic acid, acetic acid, chloroacetic acid, dichloroacetic acid, trichloroacetic acid, fluoroacetic acid, difluoroacetic acid, trifluoroacetic acid, methyl sulfonic acid, and any combination thereof. In some embodiments, the acid component is hydrochloric acid. In some embodiment, the acid component excludes hydrofluoric acid.

The stimulation fluid may comprise about 1% by weight to about 50% by weight of the salt of the nitrogen base having the fluoro inorganic anion and about 1% by weight to about 50% by weight of the acid component.

In accordance with this method, treating the formation rock may comprise dissolving at least a portion of the formation rock with the stimulation fluid. In some embodiments, the formation rock comprises a member selected from the group consisting of quartz, calcite, silica, silicates, aluminosilicates, calcium, magnesium, iron, iron oxides, iron sulfides, lead, arsenic, antimony and any combination thereof. In some embodiments, the formation rock comprises quartz.

The stimulation fluid may comprise an aqueous carrier fluid and a corrosion inhibitor. The stimulation fluid may be introduced into the wellbore using a chemical injection pump, a drip technique, a spray technique, a soaking technique, or any combination thereof.

The present disclosure also provides a method of treating formation rock, comprising contacting the formation rock with a stimulation fluid, wherein the stimulation fluid comprises a salt of a nitrogen base having a fluoro inorganic anion and an acid component.

The fluoro inorganic anion may be selected from the group consisting of tetrafluoroborate, hexafluorophosphate, and any combination thereof.

The nitrogen base may be selected from the group consisting of urea, biuret, an alkyl urea, an alkanolamine, an alkylamine, a dialkylamine, a trialkylamine, an alkyldiamine, an alkyltriamine, an alkyltetramine, a polyamine, an acrylamide, a polyacrylamide, a vinyl pyrollidone, a polyvinyl pyrollidone, and any combination thereof.

The acid component may be selected from the group consisting of hydrochloric acid, hydrobromic acid, hydrofluoric acid, formic acid, acetic acid, chloroacetic acid, dichloroacetic acid, trichloroacetic acid, fluoroacetic acid, difluoroacetic acid, trifluoroacetic acid, methyl sulfonic acid, and any combination thereof.

The formation rock may comprise a member selected from the group consisting of quartz, calcite, silica, silicates, aluminosilicates, calcium, magnesium, iron, iron oxides, iron sulfides, lead, arsenic, antimony and any combination thereof.

The present disclosure also provides a method of treating scale, comprising contacting the scale with a stimulation fluid, wherein the stimulation fluid comprises a salt of a nitrogen base having a fluoro inorganic anion and an acid component. The method may also comprise the steps of introducing the stimulation fluid into a wellbore of a well, wherein the well comprises the scale, and contacting the scale with the stimulation fluid.

In some embodiments, the scale is located on a member selected from the group consisting of a pipeline, a heat exchanger, an evaporator, a formation rock, a heating unit, and any combination thereof.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which:

FIGS. 1-3 depict the results from various dissolution tests using different fluids.

DETAILED DESCRIPTION

The present disclosure provides stimulation fluids, methods of treating rock using the stimulation fluids, methods of treating wells, such as geothermal wells, using the stimulation fluids, and methods of treating scale using the stimulation fluids. In accordance with the present disclosure, with respect to scale, "treating" may comprise preventing, dissolving, removing, reducing, any combination of the foregoing, and any other effect that may occur by contacting scale with the presently disclosed stimulation fluids. With respect to rock, "treating" may comprise dissolving, eliminating, reducing, any combination of the foregoing, and any other effect that may occur by contacting rock with the presently disclosed stimulation fluids. Further, the terms "rock," "formation rock," "reservoir rock," and the like are used interchangeably and are intended to include all solid mineral materials, such as quartz, and any other rocks found in, for example, geothermal wells. In some embodiments, "stimulation" refers to a process used to increase the flow of brine from a geothermal well.

The stimulation fluids disclosed herein may comprise various components. For example, the stimulation fluid may comprise an aqueous carrier fluid as a continuous phase. The aqueous carrier fluid may be selected from, but is not limited to, fresh water, acidified water, salt water, seawater, produced water, or any combination thereof. In some embodiments, the stimulation fluid may also comprise one or more organic solvents.

The stimulation fluids disclosed herein also comprise a salt of a nitrogen base having a fluoro inorganic anion and an acid component. In some embodiments, the fluoro inorganic anion is selected from the group consisting of tetrafluoroborate, hexafluorophosphate, and any combination thereof. In some embodiments, the fluoro inorganic anion comprises tetrafluoroborate. Additionally, the stimulation fluids may comprise the hydrolysis products of tetrafluoroborate and/or hexafluorophosphate that contain fluorine atoms.

The nitrogen base (e.g., urea) can react with the fluoro inorganic acid (e.g., fluoroboric acid) to form the salt of a nitrogen base having a fluoro inorganic anion (e.g., urea tetrafluoroborate). In some embodiments, the nitrogen base is selected from the group consisting of urea, biuret, an alkyl urea, an alkanolamine, an alkylamine, a dialkylamine, a trialkylamine, an alkyldiamine, an alkyltriamine, an alkyltetramine, a polyamine, an acrylamide, a polyacrylamide, a vinyl pyrollidone, a polyvinyl pyrollidone, and any combination thereof. In some embodiments, the nitrogen base comprises urea.

Unless otherwise indicated, "alkyl" as described herein alone or as part of another group is an optionally substituted linear saturated monovalent hydrocarbon radical or an optionally substituted branched saturated monovalent hydrocarbon radical. Linear or branched alkyl groups may have anywhere from 1 to 32 carbon atoms. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, i-hexyl, s-hexyl, t-hexyl, and the like.

In some embodiments, tetrafluoroboric acid, commonly referred to as fluoroboric acid ($HBF_4$), is combined with the nitrogen base to form the corresponding tetrafluoroborate salt. Consistent with the broader aspects of the present disclosure, one or more substantially equivalent bases, in terms of basic strength, or compounds imparting basic functionality, may be used in place of or in combination with urea.

In some embodiments, the stimulation fluids may comprise a molar ratio of the nitrogen base (such as urea) to fluoro inorganic acid (such as tetrafluoroboric acid) used to prepare the salt of about 1:3 to about 5:1, about 1:3 to about 3:1, or about 1:2 to about 3:1, for example. The nitrogen base, for example the urea component, can react with the inorganic acid, such as tetrafluoroboric acid, to form the salt of a nitrogen base, such as urea tetrafluoroborate.

The concentration of salt of a nitrogen base (such as urea) and the inorganic acid (such as tetrafluoroboric acid) in the stimulation fluid can be from, for example, about 1 wt. % to about 50 wt. %, about 1 wt. % to about 30 wt. %, about 1 wt. % to about 15 wt. %, about 5 wt. % to about 50 wt. %, about 5 wt. % to about 30 wt. %, about 5 wt. % to about 15 wt. %, about 5 wt. % to about 90 wt. %, from about 10 wt. % to about 80 wt. %, from about 50 wt. % to about 70 wt. %, from about 50 wt. % to about 60 wt. %, from about 60 wt. % to about 90 wt. %, from about 60 wt. % to about 80 wt. %, from about 60 wt. % to about 70 wt. %, from about 70 wt. % to about 90 wt. %, from about 80 wt. % to about 90 wt. %, or from about 70 wt. % to about 80 wt. %.

The stimulation fluids disclosed herein also comprise an acid component. In some embodiments, the acid component may be selected from the group consisting of hydrochloric acid, hydrobromic acid, hydrofluoric acid, formic acid, acetic acid, chloroacetic acid, dichloroacetic acid, trichloroacetic acid, fluoroacetic acid, difluoroacetic acid, trifluoroacetic acid, methyl sulfonic acid, and any combination thereof. However, the acid component is not limited to the foregoing. Additionally, the presently disclosed stimulation fluids may exclude any of the foregoing acids, such as hydrofluoric acid. In general, any component explicitly disclosed herein may be included or excluded from the stimulation fluid.

In some embodiments, the stimulation fluid comprises from about 1 wt. % to about 50 wt. % of the salt of the nitrogen base having the fluoro inorganic anion and from about 1 wt. % to about 50 wt. % of the acid component. For example, the stimulation fluid may comprise about 15% by weight of the acid component and about 30% by weight of the salt of the nitrogen base having the fluoro inorganic anion or the stimulation fluid may comprise from about 5% to about 15% by weight of the acid component and from about 5% to about 15% by weight of the salt of the nitrogen base having the fluoro inorganic anion. As an additional example, the stimulation fluid may comprise about 5% by weight of the acid component and about 5% by weight of the salt of the nitrogen base having the fluoro inorganic anion. The balance of the stimulation fluid may comprise, for example, aqueous carrier fluid, solvent, additional additives, etc.

In addition to the aforementioned components, the stimulation fluids of the present disclosure may comprise one or more additional additives. The additives include, but are not limited to, surfactants, gel stabilizers, antioxidants, permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Combinations of any of these additives can also be used.

The aforementioned salt of a urea and the tetrafluoroboric acid is disclosed in U.S. Pat. Nos. 8,389,453 and 8,796,195, the contents of which are incorporated by reference into the present application in their entirety.

The relative amounts and/or concentrations of the various components/additives in the stimulation fluids can vary widely, depending on the desired function of the fluids, the amount of rock to be treated, the level of scale to be treated, etc.

As previously mentioned, a rock as disclosed herein may comprise many different minerals. In some embodiments, a rock comprises one or more components selected from the group consisting of quartz, calcite, silica, silicates, aluminosilicates, calcium, magnesium, iron, iron oxides, iron sulfides, lead, arsenic, antimony, amorphous silica and any combination thereof. In some embodiments, the rock comprises quartz, calcite, amorphous silica, and any combination thereof. In some embodiments, the rock comprises quartz and/or calcite.

In accordance with the present disclosure, the term "scale" is used to refer to deposits/coatings comprising mineral solids and/or sediments. The deposits/coatings may form on various surfaces, such as the surface of a rock or the surface of a piece of equipment, such as a heat exchanger or a pipeline. In some embodiments, the scale comprises a member selected from the group consisting of calcium salts, magnesium salts, silica, stibnite (antimonium sulphide), and any combination thereof.

The stimulation fluids disclosed herein may be used to treat rock, wherein the treating may include dissolving some portion or all of the rock. In some embodiments, the rock is present in a well, such as, but not limited to, a geothermal well, an oil well, a gas well, an injection well, and/or a production well. The stimulation fluid is injected downhole where it contacts and treats the rock. By treating the rock, the stimulation fluid can dissolve the rock or a portion of the rock to form veins, pores, and the like, to enhance flow of geothermal fluid or of oil, for example. The stimulation fluid may be injected into a wellbore of the well using a chemical injection pump. Other methods known in the art may be used to introduce the stimulation fluid into the well. Such other methods include, for example, the use of various pressure devices, dripping, spraying, and/or soaking, including both on-line or off-line. The presently disclosed stimulation fluids may be used to treat rock found within a well/subterranean formation or it may be used to treat rock that has been removed from the surface of the earth, such as rock located in a processing plant.

In some embodiments, the scale is present at a location, or on a piece of equipment, that contacted a geothermal fluid. For example, the scale may be present in a wellbore on the surface of a rock, in a pipeline, or on a turbine. Methods may comprise, for example, contacting a scale deposit on a turbine with a stimulation fluid disclosed herein or contacting a scale deposit in a pipeline with a stimulation fluid disclosed herein. Additionally or alternatively, the stimulation fluids disclosed herein may be added to a geothermal fluid to prevent scale deposits from forming.

Certain aspects of the present disclosure relate to a method of treating rock. The method comprises introducing a stimulation fluid into a wellbore of a well that comprises rock and contacting the rock with the stimulation fluid, thereby treating the rock. The stimulation fluid comprises a salt of a nitrogen base having a fluoro inorganic anion and an acid component. The well may be a geothermal well. The salt of the nitrogen base having the fluoro inorganic anion may be urea tetrafluoroborate. The acid component may exclude hydrofluoric acid. The stimulation fluid may comprise an aqueous carrier fluid and a corrosion inhibitor. The stimulation fluid may be used to dissolve rock, thereby opening more of the fractures, veins and pores in the rock, which creates additional space and less resistance for the flow of brine.

Certain aspects of the present disclosure relate to a method of treating scale. The method comprises introducing a stimulation fluid into a wellbore of a well, which comprises scale, and contacting the scale with the stimulation fluid, thereby treating the scale. The stimulation fluid comprises a salt of a nitrogen base having a fluoro inorganic anion and an acid component. The well may be a geothermal well. The salt of the nitrogen base having the fluoro inorganic anion may be urea tetrafluoroborate. The acid component may exclude hydrofluoric acid. The stimulation fluid may comprise an aqueous carrier fluid and a corrosion inhibitor.

The corrosion inhibitor that may be used in accordance with the presently disclosed invention is not particularly limited. In some embodiments, the corrosion inhibitor is an imidazoline, a quaternary amine, a fatty acid, a phosphate ester, a carboxylic acid, an amine, a phosphate, a polyphosphate, a heavy metal, or any combination thereof.

In some embodiments, the corrosion inhibitor may be selected from alkyl, hydroxyalkyl, alkylaryl, arylalkyl or arylamine quaternary salts; mono or polycyclic aromatic amine salts; imidazoline derivatives; mono-, di- or trialkyl or alkylaryl phosphate esters; phosphate esters of hydroxylamines; phosphate esters of polyols; and monomeric or oligomeric fatty acids.

One of ordinary skill in the art can select an appropriate amount of the corrosion inhibitor to include in the stimulation fluid. In some embodiments, the stimulation fluid may comprise from about 0 to about 10 weight % of the corrosion inhibitor, such as from about 0 to about 5 weight %, from about 0 to about 3 weight % or from about 0 to about 1 weight %. In some embodiments, the stimulation fluid comprises from about 0.1 to about 5 weight % of the corrosion inhibitor, such as from about 0.1 to about 3 weight %, from about 0.1 to about 1 weight %, or from about 0.1 to about 0.5 weight %.

Over time, a well, such as a geothermal well, may lose production. The loss in production may be due to physical changes in the reservoir and/or deposition of scale mineral, which plugs veins, cracks and pores in the rock, thereby reducing the space for the brine to flow. The presently disclosed stimulation fluids treat the scale and once the scale has been treated, the stimulation fluids may also treat any underlying rock.

The present disclosure also provides a method of treating rock, comprising contacting the rock with a stimulation fluid, wherein the stimulation fluid comprises a salt of a nitrogen base having a fluoro inorganic anion and an acid component. The rock need not be located in a well. The rock may be located in, for example, a processing plant.

Additionally, the present disclosure provides a method of treating scale, comprising contacting the scale with a stimulation fluid, wherein the stimulation fluid comprises a salt of a nitrogen base having a fluoro inorganic anion and an acid component. The scale need not be located in a well. The scale may be located on a piece of equipment, for example, used in connection with a geothermal process, such as equipment used in a geothermal well or equipment used outside of a geothermal well, such as a pipeline, a turbine, a heat exchanger, an evaporator, a heating unit, and any combination thereof.

Examples

Drill cuttings were obtained and analyzed by x-ray fluorescence and diffraction. The composition of the cuttings can be seen in Table 1.

TABLE 1

| Deposit Analysis | |
|---|---|
| Appearance | |
| Color of Sample: Grey | Solids: Fragments |
| Condition of Solids: Dry | |
| Elemental Analysis by X-ray Florescence | |
| The sample preparation was: Dried at 105° C. | |
| The results are reported as oxides | |
| Calcium (CaO) | 44 wt % |
| Silicon (SiO2) | 12 wt % |
| Aluminum (Al2O3) | 4 wt % |

TABLE 1-continued

| Deposit Analysis | |
|---|---|
| Iron (Fe2O3) | 1 wt % |
| Magnesium (MgO) | 1 wt % |
| Potassium (K2O) | 1 wt % |
| Sulfur (SO3) | 1 wt % |
| Total From XRF: | 65 wt % |

The cuttings were dried at about 105° C. for about 24 hours. A known amount of the cuttings was added to a sample bottle and the weight of the bottle was recorded. A known amount of a fluid was then added to the bottle and the weight of the bottle was once again recorded. The bottle was then placed in a shaking bath. Various water temperatures in the bath were used for the testing ranging from about 40° C. to about 90° C. Shaking was carried out from about 100 rpm to about 500 rpm. The bottles were left in the bath for about 4 hours to about 168 hours. At the end of each test, the bottle was removed from the bath and about 5 mL of the fluid was withdrawn from the bottle, filtered and submitted to an ion chromatography analysis on a 1% solution (cations). Table 2 shows a filtrate analysis result.

TABLE 2

| Cations - Metals Test Method: AMW0013 | Filtered |
|---|---|
| Aluminum (Al) | <4.7 mg/kg |
| Antimony (Sb) | <4.7 mg/kg |
| Barium (Ba) | <4.7 mg/kg |
| Boron (B) | 11000 mg/kg |
| Cadmium (Cd) | <0.9 mg/kg |
| Calcium (Ca) | <9 mg/kg |
| Calcium (CaCO3) | <24 mg/kg |
| Chromium (Cr) | <0.9 mg/kg |
| Copper (Cu) | <0.9 mg/kg |
| Iron (Fe) | 32 mg/kg |
| Lead (Pb) | <0.9 mg/kg |
| Lithium (Li) | <9 mg/kg |
| Magnesium (Mg) | 12 mg/kg |
| Magnesium (CaCO3) | 48 mg/kg |
| Manganese (Mn) | <0.9 mg/kg |
| Molybdenum (Mo) | <4.7 mg/kg |
| Nickel (Ni) | <0.9 mg/kg |
| Phosphorus (P) | <9 mg/kg |
| Potassium (K) | 34 mg/kg |
| Silicon (Si) | 190 mg/kg |
| Silica (SiO2) | 420 mg/kg |
| Sodium (Na) | 34 mg/kg |
| Sodium (CaCO3) | 73 mg/kg |
| Strontium (Sr) | <9 mg/kg |
| Vanadium (V) | <4.7 mg/kg |
| Zinc (Za) | <1.9 mg/kg |

A calculation of the maximal concentration of any cations was made if all of the cuttings were to be dissolved. This concentration was compared to the concentration analyzed. The remainder of the solution plus the cuttings was filtered. The residual cuttings were weighed to evaluate the percent of dissolution by weight.

Samples tested in FIGS. 1-3 had the following characteristics shown in Table 3.

TABLE 3

| FIG. | XRF wt. % SiO2 | CaO | MgO | Al2O3 | Fe2O3 | K2 | Na2 | SO3 | TiO2 | Gravimetric Loss Loss@500C | Loss @925C |
|---|---|---|---|---|---|---|---|---|---|---|---|
| 1 | 57 | 3 | 3 | 16 | 10 | 3 | 1 | 1 | 1 | 2 | 5 |
| 2 | 57 | 0.1 | 3 | 21 | 7 | 4 | 2 | 0 | 1 | 2 | 4 |
| 3 | 67 | 2 | 1 | 14 | 5 | 5 | 3 | 0 | 1 | 1 | 1 |

As can be seen in FIGS. 1-3, various fluids were tested as well as various elements (Ca, $SiO_2$, Mg, Al and Fe). Each element in the figures includes 5 columns above. The first column for each element in every drawing figure is water and the value is shown as 0 above the x-axis (meaning no dissolution occurred). The second column is a 4 weight % solution of GEO991, which is a urea neutralized tetra fluoroborate. The third column is a 16 weight % solution of GEO991 and the fourth column is a 16 weight % HCl solution. The fifth column is a fluid comprising about 4 weight % GEO991 and about 12 weight % HCl.

The results depicted in FIGS. 1-3 indicate that certain components of the stimulation fluids disclosed herein display synergy. For example, the salt of the nitrogen base having the fluoro inorganic anion (such as urea tetrafluoroborate) and the acid component (such as hydrochloric acid) display synergy when used to dissolve rock and/or scale. With respect to FIG. 2, for example, when a 16% HCl solution was used to treat $SiO_2$, 0% dissolution occurred. When a 4% solution of the urea tetrafluoroborate was used to treat $SiO_2$, about 25% dissolution occurred. However, when a fluid comprising about 4 weight % urea tetrafluoroborate and about 12 weight % HCl was used, about 56% dissolution occurred, which is unexpected since HCl had no effect on dissolution when used alone.

Components of the stimulation fluids disclosed herein act synergistically to treat scale and/or rock, enlarge openings, pores, veins, etc., found in rock, to thereby increase geothermal production (including increasing production flow and/or increasing reinjection flow).

Advantageously, the presently disclosed stimulation fluid does not release any gas while functioning, as opposed to other treatments, such as those comprising the use of hydrofluoric acid, which emits hazardous vapors. The presently disclosed stimulation fluids are also far less corrosive than hydrofluoric acid as well.

Any fluid disclosed herein may comprise, consist of, or consist essentially of any of the components/additives disclosed herein. In accordance with the present disclosure, the phrases "consist essentially of," "consists essentially of," "consisting essentially of," and the like limit the scope of a claim to the specified materials or steps and those materials or steps that do not materially affect the basic and novel characteristic(s) of the claimed invention.

As used herein, the term "about" refers to the cited value being within the errors arising from the standard deviation found in their respective testing measurements, and if those errors cannot be determined, then "about" refers to within 10% of the cited value.

All of the fluids and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated.

In addition, unless expressly stated to the contrary, use of the term "a" is intended to include "at least one" or "one or more." For example, "a corrosion inhibitor" is intended to include "at least one corrosion inhibitor" or "one or more corrosion inhibitors."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of treating formation rock, comprising:
   introducing a stimulation fluid into a wellbore of a well, wherein the well comprises the formation rock; and
   contacting the formation rock with the stimulation fluid, wherein the stimulation fluid comprises a salt of a nitrogen base having a fluoro inorganic anion and an acid component,
   wherein the nitrogen base is selected from the group consisting of urea, biuret, an alkyl urea, an alkanolamine, an alkylamine, a dialkylamine, a trialkylamine, an alkyldiamine, an alkyltriamine, an alkyltetramine, a polyamine, an acrylamide, a polyacrylamide, a vinyl pyrollidone, a polyvinyl pyrollidone, and any combination thereof, and
   wherein the acid component is hydrochloric acid.

2. The method of claim 1, wherein the well is a geothermal well.

3. The method of claim 1, wherein the fluoro inorganic anion is selected from the group consisting of tetrafluoroborate, hexafluorophosphate, and any combination thereof.

4. The method of claim 1, wherein the nitrogen base comprises urea.

5. The method of claim 1, wherein the salt of the nitrogen base having the fluoro inorganic anion is urea tetrafluoroborate.

6. The method of claim 1, wherein the acid component excludes hydrofluoric acid.

7. The method of claim 1, wherein the stimulation fluid comprises about 4% by weight of the salt of the nitrogen base having the fluoro inorganic anion and about 12% by weight of the acid component.

8. The method of claim 1, wherein treating the formation rock comprises dissolving at least a portion of the formation rock with the stimulation fluid.

9. The method of claim 1, wherein the formation rock comprises a member selected from the group consisting of quartz, calcite, silica, silicates, aluminosilicates, calcium, magnesium, iron, iron oxides, iron sulfides, lead, arsenic, antimony and any combination thereof.

10. The method of claim 1, wherein the formation rock comprises quartz.

11. The method of claim 1, wherein the stimulation fluid comprises an aqueous carrier fluid and a corrosion inhibitor.

12. The method of claim 1, wherein the stimulation fluid is introduced into the wellbore using a chemical injection pump, a drip technique, a spray technique, a soaking technique, or any combination thereof.

13. A method of treating formation rock, comprising:
contacting the formation rock with a stimulation fluid, wherein the stimulation fluid comprises a salt of a nitrogen base having a fluoro inorganic anion and an acid component,
wherein the nitrogen base is selected from the group consisting of urea, biuret, an alkyl urea, an alkanolamine, an alkylamine, a dialkylamine, a trialkylamine, an alkyldiamine, an alkyltriamine, an alkyltetramine, a polyamine, an acrylamide, a polyacrylamide, a vinyl pyrollidone, a polyvinyl pyrollidone, and any combination thereof, and
wherein the acid component is hydrochloric acid.

14. The method of claim 13, wherein the fluoro inorganic anion is selected from the group consisting of tetrafluoroborate, hexafluorophosphate, and any combination thereof.

15. A method of treating scale, comprising:
introducing a stimulation fluid into a wellbore of a well, wherein the well comprises the scale, and contacting the scale with the stimulation fluid, wherein the stimulation fluid comprises a salt of a nitrogen base having a fluoro inorganic anion and an acid component, and wherein the acid component comprises hydrochloric acid.

* * * * *